United States Patent [19]

Holmes

[11] Patent Number: 5,272,949
[45] Date of Patent: Dec. 28, 1993

[54] DEVICE FOR CUTTING SOD GROWN OVER PLASTIC SHEETING

[75] Inventor: Robert Holmes, Hilliard, Ohio

[73] Assignee: Buckeye Bluegrass Farms, Inc., Ostrander, Ohio

[21] Appl. No.: 949,589

[22] Filed: Sep. 23, 1992

[51] Int. Cl.⁵ .................................... A01B 45/04
[52] U.S. Cl. .................................... 83/870; 83/13; 172/19; 172/20
[58] Field of Search ............... 83/870, 13; 172/17, 172/20; 56/DIG. 17, DIG. 20

[56] References Cited

U.S. PATENT DOCUMENTS

| | | | |
|---|---|---|---|
| 284,720 | 9/1883 | Calvert | 172/20 |
| 1,537,412 | 5/1925 | Dafferner | 172/19 |
| 1,914,528 | 6/1933 | Reid | 26/7 |
| 2,682,824 | 7/1954 | Bowser et al. | 172/19 |
| 3,357,499 | 12/1967 | Finneyfrock | 172/19 |
| 3,410,350 | 11/1968 | Ware | 172/20 |
| 3,807,504 | 4/1974 | Nunes, Jr. | 172/20 |
| 5,170,848 | 12/1992 | Walton | 172/19 |

FOREIGN PATENT DOCUMENTS 2011620 10/1970 Fed. Rep. of Germany ........ 172/20

*Primary Examiner*—Scott Smith
*Attorney, Agent, or Firm*—Isaac Angres

[57] ABSTRACT

A device which cuts sods that are grown over plastic sheeting without cutting or damaging the plastic sheeting which is then retained in place to be used again for subsequent crops. The cutter performs four functions: (1) it inserts a vibrating lifting plate between the plastic and the sod and separates and lifts the sod off the plastic; (2) it conveys the sod to the cutting mechanism; (3) it cleanly cuts the sod; and (4) it leaves the plastic undamaged. After cutting, the sod can be harvested by a roller attached behind the cutting mechanism so that the cutting and rolling are done in one operation or the rolling can be done separately at a later time. The mechanism can be arranged in multiples on a toolbar; and the cutter can be attached to conventional sod harvesting equipment with only slight modification.

2 Claims, 1 Drawing Sheet

DEVICE FOR CUTTING SOD GROWN OVER PLASTIC SHEETING

TECHNICAL FIELD

This invention, for which a Document Disclosure (No. 273,599) for a prototype was filed earlier and dated Feb. 6, 1991, relates generally to sod production and more particularly to the method of growing sods over an impervious surface such as plastic sheeting. This invention cuts sods that are grown over plastic sheeting without cutting or damaging in any way the plastic sheeting which is then retained in place to be used again for subsequent crops. This novel cutter compliments an innovative method, The Big Roll BioSod Turf System (Decker, 1991), for growing grass, wildflower, crown vetch, in fact sods of all kinds, in a mulch/compost martrix over plastic sheeting for which a patent was issued earlier U.S. Pat. No. 4,986,026).

BACKGROUND OF THE INVENTION

The concept of growing grasses over an impervious surface, typically plastic sheeting, goes back, at least in the United States, to experiments conducted in the 1960's by Dr. Henry F. Decker at Ohio Wesleyan University, in Delaware, Oh. It was proved at that time that many types of grasses would grow well and would produce sods rapidly in various contrived media placed over plastic sheeting (Decker, 1975).

In harvesting the sod, however, until this invention, the Plastic sheeting on which the sod had been growing has been considered expendable and is typically destroyed in the harvesting process thus adding to labor and production costs. In addition the practice is environmentally questionable since it eliminates a perfectly good opportunity to recycle and reuse the plastic for subsequent sod crops.

SUMMARY OF THE INVENTION

The cutter I have invented performs four functions:
1. It inserts a metal or high density plastic lifting plate between the plastic sheeting and the sod and separates and lifts the sod Off the plastic; 2. It helps move or convey the sod to the cutting mechanism; 3. it cleanly cuts the sod; and 4., it leaves the plastic undamaged.

The sod is then harvested by a roller that can be attached behind the cutting mechanism so that the cutting and rolling are done in one operation by one operator; or the rolling can be done separately at a later time. In either case the sod can be rolled into big rolls on the order of three feet or more wide, one or more feet in diameter, and of sufficient length to comprise 25 square yards or more.

Once the sod is cut on the plastic, and with only slight modifications, it can also be picked up and stacked on pallets in rolls or sheets by conventional sod harvesting equipment.

The first function of the cutter, separating and lifting the sod off the plastic, can be accomplished by inserting under the sod but on top or slightly above the plastic sheeting (about ¼th inch) a split, circular, vibrating, metal or high density plastic, plano convex plate or discuss that separates and lifts the sod off the plastic.

The second function, conveying the sod to the cutting mechanism, is accomplished by the vibrations and forward movement of the two halves of the lifting plate or discuss.

The sod is cut by a whirling, circular blade, coulter, or disc that fits between the halves of the lifting plate.

In a 1988 version of the device the Tifting plate is stationary and preceded by a small plastic or steel roller that inserted between the sod and the plastic. In a second prototype a roller chain or belt was used to help lift and convey the sod to the cutting blade. In the cutter described herein the vibration of the lifting plate obviates the roller and the chain or belt.

The cutter can be mounted in multiples along a tool bar or placed at the front, middle, or rear of a tractor. It can he self-propelled; or it can be attached to and work in conjunction with a sod rolling/ harvesting mechanism.

All of the separate discrete functions of the machine Such as lifting, separating, conveying, and cutting the sod can be powered by one or more hydraulic motors, by one or more ground driven wheels, by the PTO of a tractor, by a separate gas engine, or by a combination of the above power sources.

PREFERRED EMBODIMENT OF THE INVENTION

Figure 1:
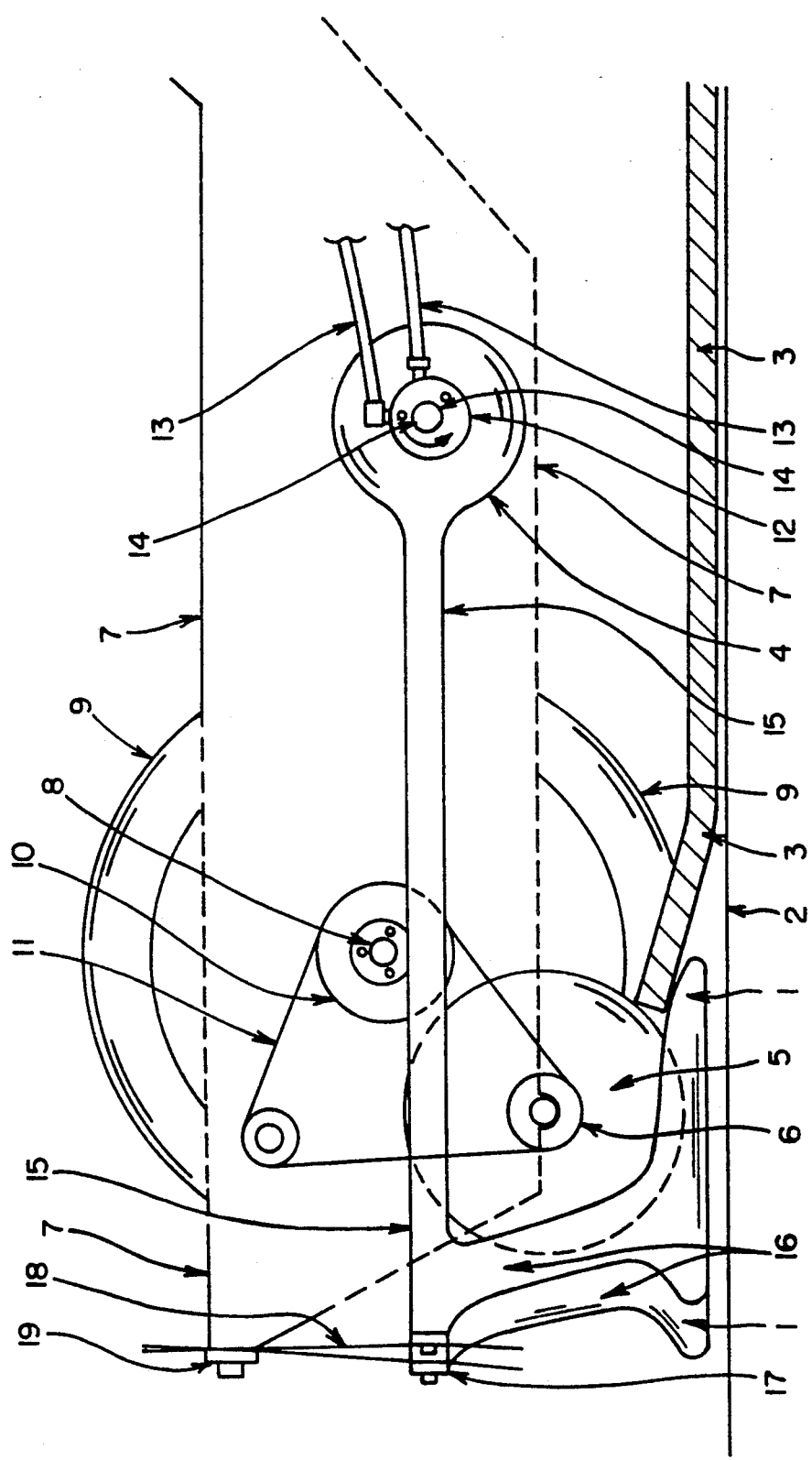
FIG. 1 is a side view of the cutting device with most of the supporting frame and the nearest of two wheels removed to expose the lifting, conveying, and cutting mechanisms.

Referring now more particularly to FIG. 1 which is a simple, workable embodiment of the invention:

A circular, plano-convex, discuss or lifting plate 1 that is split in half, the halves separated by about ¼th of an inch, and that vibrates forward and back, is inserted between the plastic sheeting 2 and the sod 3. The leading edge of the plano-convex lifting plate 1 follows an oval path which allows it to move downward and forward to get under the sod 3. It then lifts and moves to the rear. The motion of the plano-convex lifting plate 1 is controlled and powered by the eccentric bearing 4.

The vibration of the lifting plate 1 and the forward movement of the entire machine cause the sod to be separated from and lifted off the plastic sheeting 2 and conveyed backward to the cutting mechanism 5. This consists of a steel, circular, saw type blade 5 attached to an axle, sprocket, and bearing 6 rapidly revolving between the halves of the lifting plate 1. The sod is cleanly cut by the whirling action of the circular blade 5 and either drops back to the surface of the plastic or is, shortly after cutting, rolled up by a rolling/harvesting mechanism to which the cutter can be attached.

The supporting frame 7 of the device is mounted to the axle 8 of two ground driven wheels 9 which by sprocket 10 and chain 11 can supply the power for the functioning of the circular blade 5. The vibrating action of the lifting plate 1 can be powered by a small hydraulic motor 12 attached by hydraulic lines 13 to a pulling vehicle. The axle of the motor 14 is attached to eccentric bearings 4, to bars 15, to posts 16, that are attached to and drive each half of the lifting plate 1.

At the back end of the supporting frame 7, each bar 15 is bolted 17 to a spring steel hinge 18 that helps support and effect the vibrating action of each half lifting plate 1. The spring hinges 18 are attached to the back top of the supporting frame 7 by a retaining clamp 19. The height of the lifting plate 1 above the plastic is maintained by the driving wheels 9 and can be changed by adjusting the length of the spring hinges 18, releasing then tightening the retaining clamp 19.

What is claimed is:

1. A method for cutting sod grown over sheeting comprising the steps of:

transporting a frame over sod grown over sheeting, inserting blunt plate elements connected to said frame between said sod and said sheeting without cutting said sheeting, reciprocating said blunt plate elements in an oval path between said sod and said sheeting in a manner so that said sod is lifted in a peeling action from said sheeting while said sheeting is pushed below said sod and maintained intact and uncut below said sod, and subsequently cutting said sod so lifted by said blunt plate elements by a cutting means supported on said frame above said sheeting.

2. A method for cutting sod as claimed in claim 1 wherein the method for transporting maintains a substantially equal distance between said frame and said sod as said frame moves over said sod.

* * * * *